UNITED STATES PATENT OFFICE.

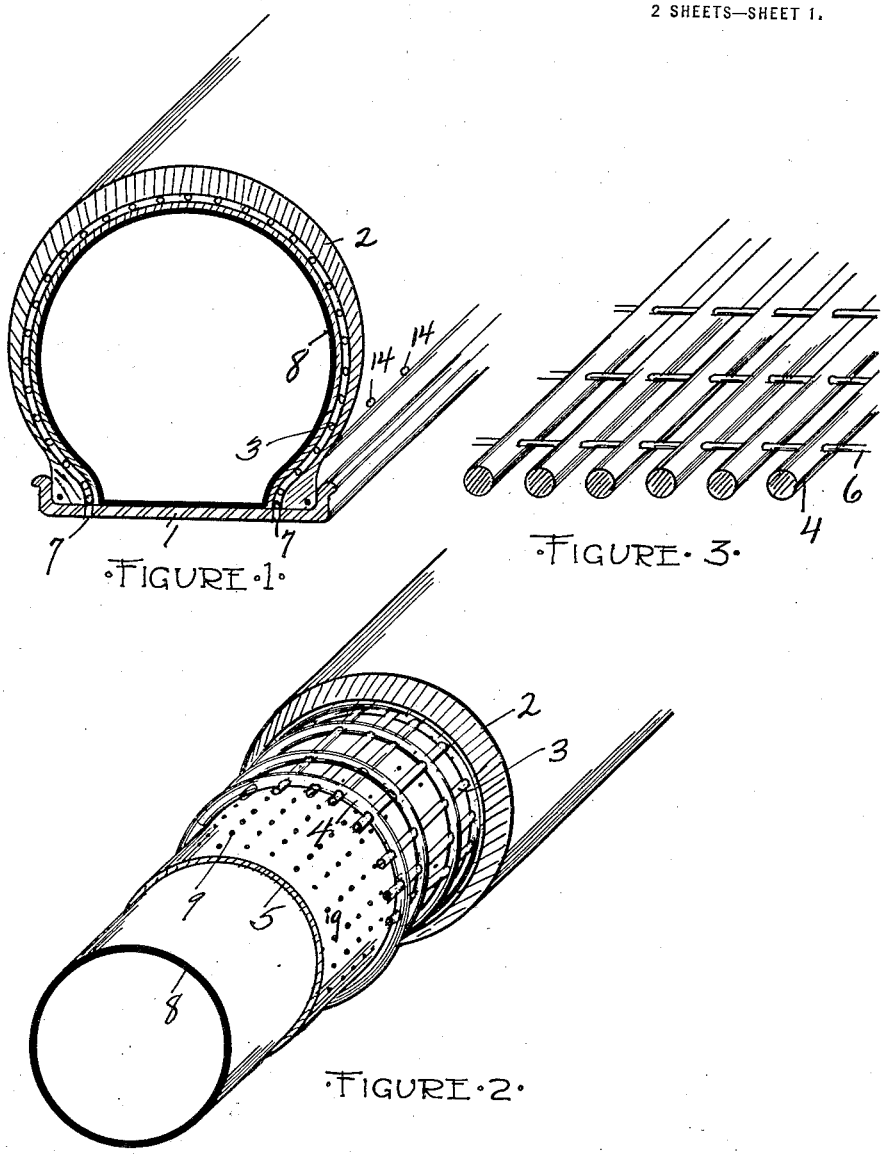

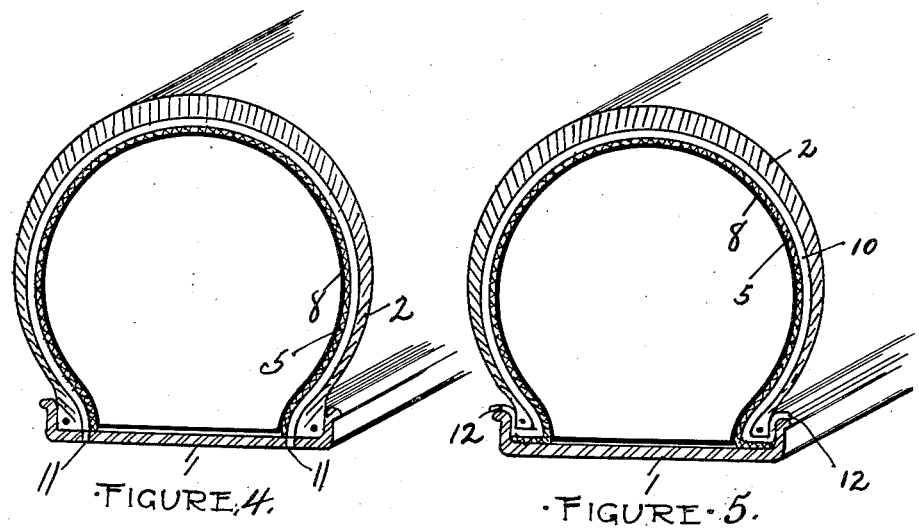
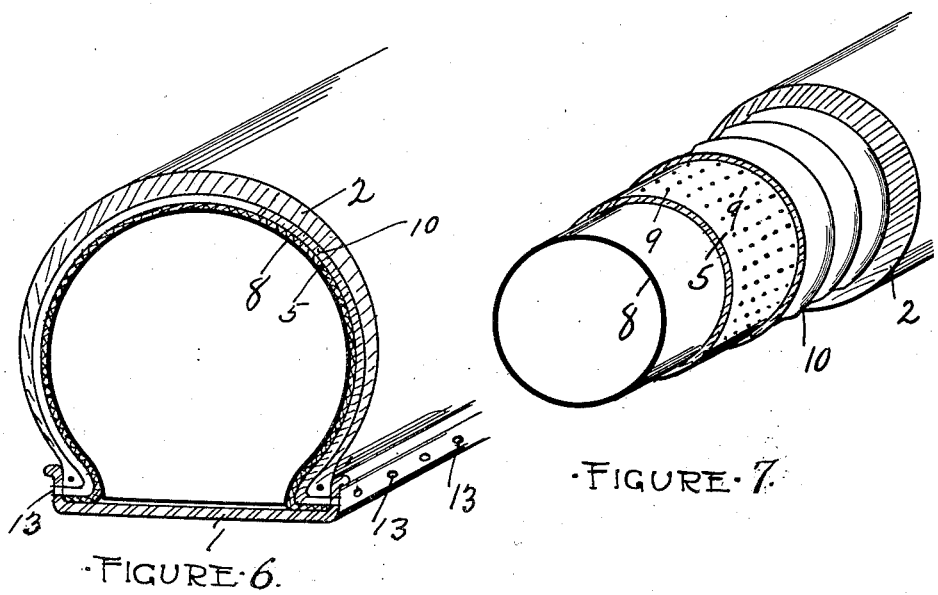

ROBERT W. MELLOR, OF GIRARD, OHIO.

AIR-CHILL FOR VEHICLE-TIRES.

1,374,382.  Specification of Letters Patent.  Patented Apr. 12, 1921.

Application filed November 3, 1919. Serial No. 335,383.

*To all whom it may concern:*

Be it known that I, ROBERT W. MELLOR, a citizen of the United States of America, residing at Girard, in the county of Trumbull and State of Ohio, have invented certain new and useful Improvements in Air-Chills for Vehicle-Tires, of which the following is a specification.

My invention relates to a device for ventilating between the outer casing and the inner tube of ordinary pneumatic vehicle tires.

The principal object is to eliminate the heat produced by friction between the outer casing and inner tube when the vehicle is traveling. When tubes are subjected to this heat the tube becomes less useful because the heat causes the rubber to lose its original elasticity and becomes brittle. If the tube becomes sufficiently heated it will cause the pressure to be great enough to cause a rupture of the inner tube and outer casing.

A further object is to carry out this object by means of a corded casing fitting within the outer casing, a perforated partition between the corded casing and the inner tube. The air is admitted from openings in the rim of the wheel and is carried or allowed to circulate between the corded casing and the perforated partition.

A still further object of my invention is to supply a ridged casing which fits within the outer casing, taking the place of the corded casing when additional strength is required as is desirable in large tires where the weight carried causes a heavier strain on the outer casing. In this ridged casing it will be understood that as the ridges are formed around the perforated partition the air is allowed to circulate between the perforated partition and the openings formed underneath the ridged casing. It is understood that the corded or ridged casing may be a part of the outer casing.

In the accompanying drawings I have illustrated both methods of ventilating the space between the inner tube and outer casing. Figure 1 is a sectional view when the corded casing is used. Fig. 2 is a sectional view showing the inner tube, the perforated partition, the corded casing and the outer casing. Fig. 3 is a detailed view showing a section of the corded casing. Fig. 4 is a sectional view showing the installment of the ridged casing, when the air is admitted through the rim.

Fig. 5 is a sectional view showing the air emitted from the outer edge of the rim. Fig. 6 is a sectional view showing the air admitted along the upturned face of the rim. Fig. 7 is a detailed view showing the inner tube, perforated partition, ridged casing and outer casing.

By referring to Fig. 1 it will be seen that I have provided a rim 1. Upon this rim is installed an outer casing 2. Within the outer casing 2, I have provided a corded casing 3 constructed of large and small cords. The large cords 4 are positioned around the perforated partition 5, while the small cords 6 extend lengthwise around the tire.

By referring again to Fig. 1 it will be seen I have provided openings 7 in the base of the rim 1, these openings 7 to be spaced so that there will be an opening between each of the larger cords 4. The air entering the openings 7 is thereby allowed to ventilate between the cords 4 and cools the inner tube 8 through the openings 9 of the perforated partition 5.

By referring to Fig. 7 it will be seen that I have provided a ridged casing 10, which fits within the outer casing 2.

By referring to Figs. 4, 5 and 6 it will be seen I have provided different ways of admitting the air for ventilating purposes. In Fig. 4 the air is admitted through the base of the rim 1 at openings 11. In Fig. 5 the air is admitted for ventilating purposes through the holes 12, and in Fig. 6 the air is admitted for ventilating purposes through the openings 13, spaced along the upturned portion of the rim 1. In Fig. 1 the air is also admitted through openings 14 in the outer casing 2.

It is understood that minor changes may be made in the construction and arrangement of parts, and I do not wish to restrict myself to the specific structure shown except in so far as I am compelled to in the claims.

What I claim is:

1. In a device of the class described an outer casing, a corded casing within the outer casing, the corded casing constructed of large and small cords, the large cords running transversely of the inner portion of the casing, while the small cords extend lengthwise with the circumference of the casing, a perforated partition located between the inner tube and the corded casing substantially as described for the purpose set forth.

2. In a device of the class described an outer casing, a corded casing within the outer casing, a perforated partition between the inner tube and the corded casing, openings through the base of the rim holding the casing, said openings spaced apart so as to ventilate between the larger cords of the corded casing.

In testimony whereof I affix my signature.

ROBERT W. MELLOR.

Witnesses:
MARTHA B. McCARTNEY,
HENRY GREENWALD.